United States Patent [19]

Ichikawa et al.

[11] Patent Number: 5,678,077
[45] Date of Patent: Oct. 14, 1997

[54] ELECTRONIC FLASH DEVICE AND CAMERA EQUIPPED WITH SAID DEVICE

[75] Inventors: Tsutomu Ichikawa, Sakai; Koutaro Kawabe, Neyagawa, both of Japan

[73] Assignee: Minolta Co., Ltd., Osaka, Japan

[21] Appl. No.: 718,267

[22] Filed: Sep. 20, 1996

[30] Foreign Application Priority Data

Sep. 25, 1995 [JP] Japan .................................. 7-245884

[51] Int. Cl.$^6$ .................................................. G03B 7/26
[52] U.S. Cl. .......................... 396/205; 396/156; 396/206
[58] Field of Search .................................. 396/156, 205, 396/206

[56] References Cited

U.S. PATENT DOCUMENTS

| 4,236,796 | 12/1980 | Hayashi et al. | 396/206 |
| 4,566,769 | 1/1986 | Inoue | 396/205 |
| 4,610,521 | 9/1986 | Inoue | 396/206 |
| 4,839,686 | 6/1989 | Hosomizu et al. | 396/156 |
| 4,999,663 | 3/1991 | Nakamura | 396/206 |
| 5,068,575 | 11/1991 | Dunsmore et al. | 396/206 |
| 5,101,335 | 3/1992 | Ludden et al. | 396/206 |
| 5,249,007 | 9/1993 | Tanaka | 396/205 |
| 5,250,977 | 10/1993 | Tanaka | 396/206 |

FOREIGN PATENT DOCUMENTS

H 2-131227  5/1990  Japan .
H 7-123713  5/1995  Japan .

Primary Examiner—Russell E. Adams
Attorney, Agent, or Firm—Burns, Doane, Swecker & Mathis, LLP

[57] ABSTRACT

The oscillating switching element of step-up transformer comprises a dedicated high-frequency FET and is placed between center tap of the primary coil and the ground of the primary circuit. Terminal of the primary coil on the side of the ground is connected to the connection point between xenon tube and the light emission controlling switching element, i.e., an IGBT, via diode. Charge voltage of main capacitor is detected by voltage detection circuit, and when charge voltage is below threshold voltage, controller drives the IGBT at a low frequency, while when charge voltage has exceeded threshold voltage, it drives the FET at a high frequency to charge main capacitor. The charging of main capacitor is made faster and more efficient by changing the switching frequency and by switching the switching element between the IGBT and the FET as charge voltage increases.

16 Claims, 7 Drawing Sheets

ELECTRONIC FLASH DEVICE AND CAMERA EQUIPPED WITH SAID DEVICE

BACKGROUND OF THE INVENTION

1. Field of the Invention

The present invention pertains to an electronic flash device and a camera equipped with said device, and more particularly, an electronic flash device that causes a light emission tube to emit light by accumulating the output from a power source after boosting it and discharging said accumulated output, and a camera equipped with said electronic flash device.

2. Description of the Prior Art

An electronic flash device for a camera comprises mainly a power supply battery, a DC-DC converter that boosts the voltage from the battery to a prescribed high level, a main capacitor that accumulates charge, a xenon tube that generates flash light through the discharge of the charge accumulated in the main capacitor, and a light emission controller that controls the amount of light emitted from the xenon tube.

The DC-DC converter comprises a step-up transformer, an oscillating switching element that is located in the primary circuit of the step-up transformer and that converts the provided battery power supply (DC power supply) into AC current, and a rectifying circuit that is located in the secondary circuit of the step-up transformer and that converts AC output into DC output. Said DC-DC converter charges the main capacitor at a high speed by transforming the power supply provided from the battery power source into high-voltage DC current.

The light emission controller comprises a trigger circuit that applies a several-kV trigger voltage to the xenon tube and a light emission controlling switching element such as an IGBT (insulated gate bipolar transistor) that is located between the xenon tube and the ground. Light emission is begun by turning ON this switching element such that a discharge route for the main capacitor is created and then applying the trigger voltage described above to the xenon tube. The light emission is then discontinued by turning OFF the switching element in accordance with a prescribed timing sequence.

Conventionally, in Japanese Laid-Open patent Hei 2-131227, for example, an electronic flash device is disclosed in which the DC-DC converter oscillating switching element is also used as a light emission controlling switching element of the light emission controller for the purpose of achieving compactness and low cost.

Incidentally, it is known that the transforming efficiency of a step-up transformer increases as it is driven at a higher frequency and that driving frequency f to achieve an appropriate efficiency is expressed as $f=k \cdot V2/N2$ (where k is a proportional constant, V2 is the secondary voltage and N2 is the number of twists of the secondary coil). Therefore, it is preferred that the driving frequency be raised as the main capacitor charge voltage increases in order to charge the main capacitor at a high speed and with high efficiency.

However, if charging control in which the driving frequency is raised as the main capacitor charge voltage increases is applied in Japanese Laid-Open patent Hei 2-131227 described above, switching loss would be large during driving at a high frequency, which in turn would reduce efficiency. This would work against achieving high-speed charging.

In other words, the light emission controlling switching element is mainly intended to control the discontinuation of light emission with high accuracy, and, for example, an IGBT, power transistor, etc., that can handle large current and has superior response characteristics is used for this switching. However, since these elements have a large switching loss in the high-frequency range, if the driving frequency is raised as the charge voltage increases, the efficiency of the DC-DC converter decreases, which will lower charging efficiency.

SUMMARY OF THE INVENTION

The object of the present invention is to obtain an electronic flash device having good charging efficiency or a camera equipped with said electronic flash device.

Another object of the present invention is to obtain an electronic flash device that can be made compact in size or a camera equipped with said electronic flash device.

Yet another object of the present invention is to obtain an electronic flash device that is inexpensive to manufacture or a camera equipped with said electronic flash device.

In order to attain the objects described above, one aspect of the present invention comprises, a DC power source, a step-up transformer that boosts the output from the DC power source, a charge accumulating element that accumulates charge based on the output of the step-up transformer, a flash light emission tube that emits light through the discharge of charge accumulated in the charge accumulating element, a first switching element that intermittently enables and disables application of the output from the DC power source to the primary coil of the step-up transformer, a second switching element one end of which is connected to the primary coil of the step-up transformer and the flash light emission tube and the other end of which is connected to the grounding side of the charge accumulating element and that controls the light emission of the flash light emission tube and intermittently enables and disables application of the output from the DC power source to the primary coil of the step-up transformer, and a selector that alternates between the first switching element and the second switching element.

Using the construction described above, efficient charging can be achieved through appropriate switching between the first switching element and the second switching element.

These and other objects, advantages and features of the invention will become apparent from the following description thereof taken in conjunction with the accompanying drawings, which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

Figure 7:
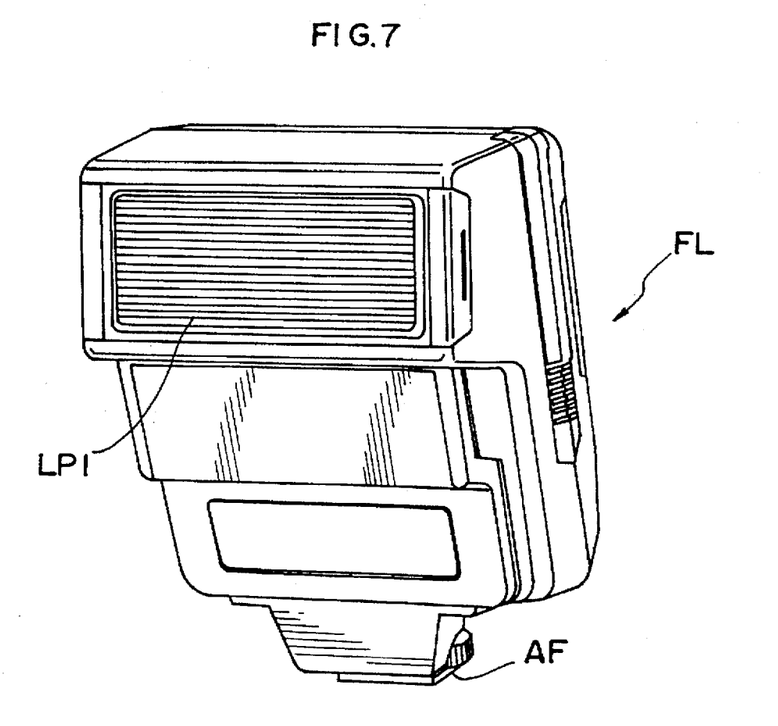
FIG. 7 shows an external view of the flash light emitting device pertaining to the first embodiment of the present invention.

FIG. 7 shows an external view of the electronic flash device pertaining to the first embodiment of the present invention. In the drawing, electronic flash device FL1 is detachably mounted to the camera, and has accessory foot AF used for the mounting onto the camera as well as flash light emission outlet LP1.

Figure 1:
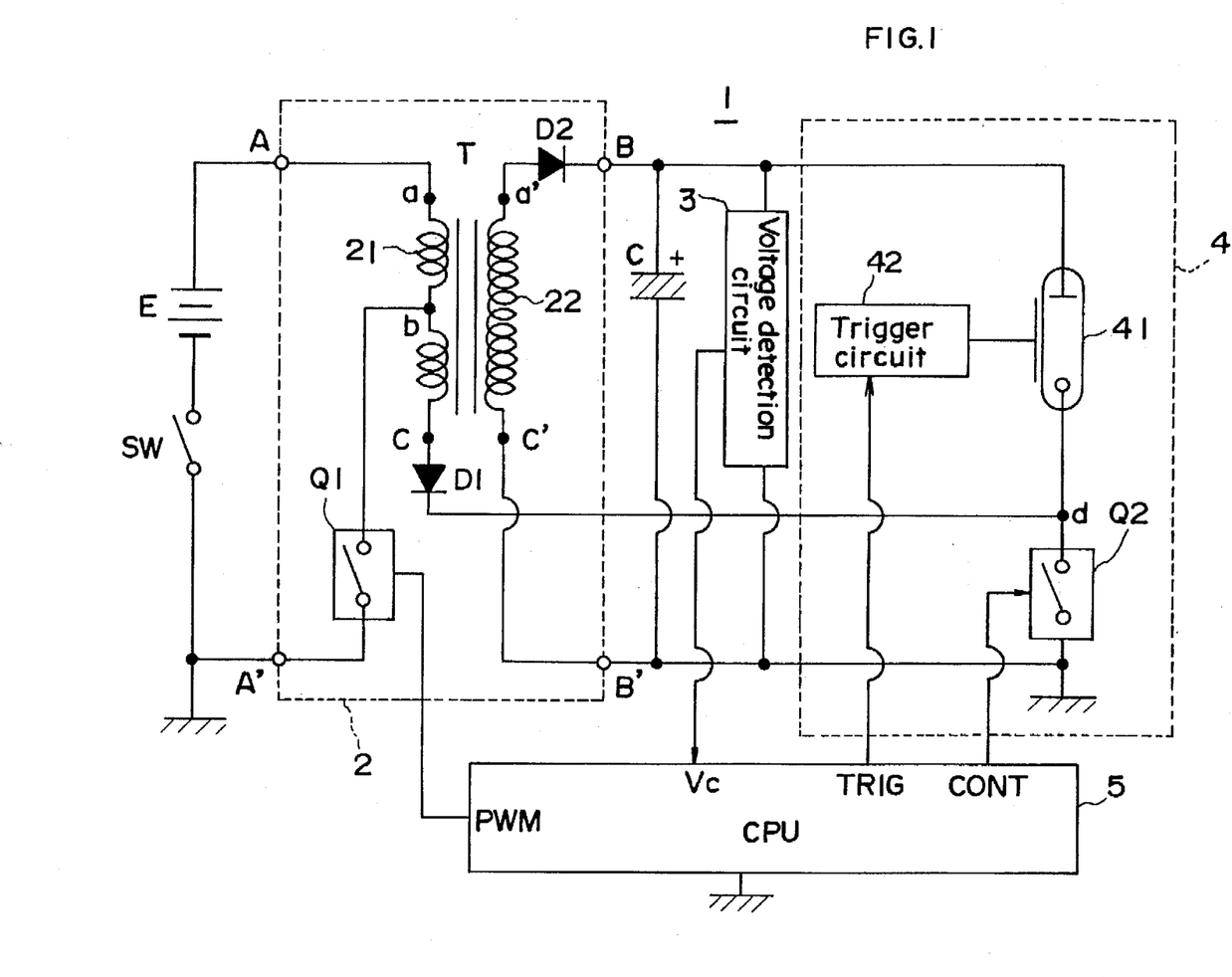
FIG. 1 is a circuit diagram pertaining to a first embodiment of the present invention.

FIG. 1 is a circuit diagram of the electronic flash device described above.

Flash device circuit 1 comprises power switch SW, battery E that provides power supply for flash light generation, DC-DC converter circuit 2 that boosts the voltage from battery E to a prescribed level of DC voltage, main capacitor C that accumulates charge for flash light generation, voltage detection circuit 3 that detects charge voltage VC of this main capacitor C, flash light generating unit 4 that generates flash light, and controller 5 (shown as 'CPU' in the drawings) that controls flash light generating operation.

A series circuit comprising battery E and power switch SW is connected to input terminals A and A' of the primary circuit of DC-DC converter circuit 2, while main capacitor C, voltage detection circuit 3 and flash light generating unit 4 are connected in parallel fashion to output terminals B and B' of the secondary circuit of DC-DC converter circuit 2.

Input terminal A' is a negative terminal (grounding terminal) of the primary circuit and input terminal A is a positive terminal into which voltage is input. Output terminal B' is a negative terminal (grounding terminal) of the secondary circuit and output terminal B is a positive terminal from which voltage is output.

DC-DC converter circuit 2 comprises step-up transformer T, switching element Q1 that intermittently interrupts at a prescribed frequency the fixed voltage current from battery E that is applied to primary coil 21 of step-up transformer T, diode D1 that prevents the reflux of discharge current to primary coil 21 during flash light generation, and diode D2 that rectifies the AD power output from secondary coil 22 of step-up transformer T.

Center tap b is placed in primary coil 21, so that a first coil member is formed by the coil between one end a connected to the positive electrode of battery E and other end c and a second coil member is formed by the coil between said one end a and center tap b. Switching element Q1 described above is placed between this center tap b and grounding terminal A' of the primary circuit of step-up transformer T. For this switching element Q1, a relatively low-power semiconductor element having superior high-frequency characteristics that can intermittently interrupt the power supply applied to the second coil member of primary coil 21 at a high frequency, such as a power transistor and power FET, is used. The turning ON and OFF of switching element Q1 is controlled based on PWM signals output from controller 5.

One end a of primary coil 21 is connected to the positive electrode of battery E. Diode D1 is placed between other end c of primary coil 21 and connection point d between xenon tube 41 of flash light generating unit 4 described below and light emission controlling switching element Q2. The anode of diode D1 is connected to other end c of primary coil 21 and the cathode is connected to connection point d described above.

On the other hand, diode D2 is placed between one end a' of secondary coil 22 of DC-DC converter circuit 2 and positive terminal B of the secondary circuit. The anode of diode D2 is connected to one end a' and the cathode is connected to positive terminal B.

Charge voltage VC of main capacitor C is detected by voltage detection circuit 3 and the detected result is used to control the switching frequency for the voltage applied to the primary circuit of step-up transformer T.

In this embodiment, the switching frequency is changed and switching between switching elements Q1 and Q2 takes place based on whether or not charge voltage VC exceeds preset threshold voltage VTH, as described below. The result of detection by voltage detection circuit 3 is input to controller 5, which carries out the changing of the switching frequency as well as the switching between switching elements Q1 and Q2.

Flash light generating unit 4 is placed behind flash light emission outlet LP1, and comprises xenon tube 41 that generates flashlight, trigger circuit 42 that starts light emission by xenon tube 41 and switching element Q2 that forcibly discontinues the light emission by xenon tube 41. Switching element Q2 also works as a switching element to intermittently interrupt the voltage applied to primary coil 21 of step-up transformer T when charging begins. Xenon tube 41 and switching element Q2 are serially connected, and this series circuit is connected to output terminals B and B' of DC-DC converter circuit 2.

The driving of trigger circuit 42 and switching element Q2 is controlled by controller 5. Through the control of the timing to drive these members, the light emission and the amount of light emission of flash light generating unit 4 are controlled. In other words, when a start signal is sent from the camera via a terminal formed on accessory foot AF, controller 5 turns ON switching element Q2 (that is, the xenon tube 41 discharge loop is closed), and outputs a light emission start signal to trigger circuit 42 instructing light emission according to a prescribed timing sequence. When a trigger voltage (a high voltage of several kV) generated based on this light emission start signal is applied to xenon tube 41, the accumulated charge of main capacitor C is discharged via xenon tube 41 and flash light is generated. When switching element Q2 is turned OFF by controller 5 to obtain light emission discontinuation in accordance with a prescribed timing sequence, the discharge current flowing in xenon tube 41 is hindered, by which light emission is forcibly discontinued.

For switching element Q2, a semiconductor element such as a power FET, power transistor and SCR (semiconductor controlled rectifier) may be used. However, since switching element Q2 is intended to control the amount of light emission with high accuracy by instantly discontinuing the light emission by xenon tube 41 as described above, it is preferred that a high-power and high-response IGBT be used.

Controller 5 comprises a microcomputer. It controls the voltage output by step-up transformer T through the switching between switching elements Q1 and Q2 and the control of the switching frequency of switching element Q1 or Q2 based on the voltage detected by voltage detection circuit 3, and charges main capacitor C at a high speed and with high efficiency. It also controls the light emission and amount of light emission by xenon tube 41 through the control of driving of switching element Q2 and trigger circuit 4.

Figure 2:
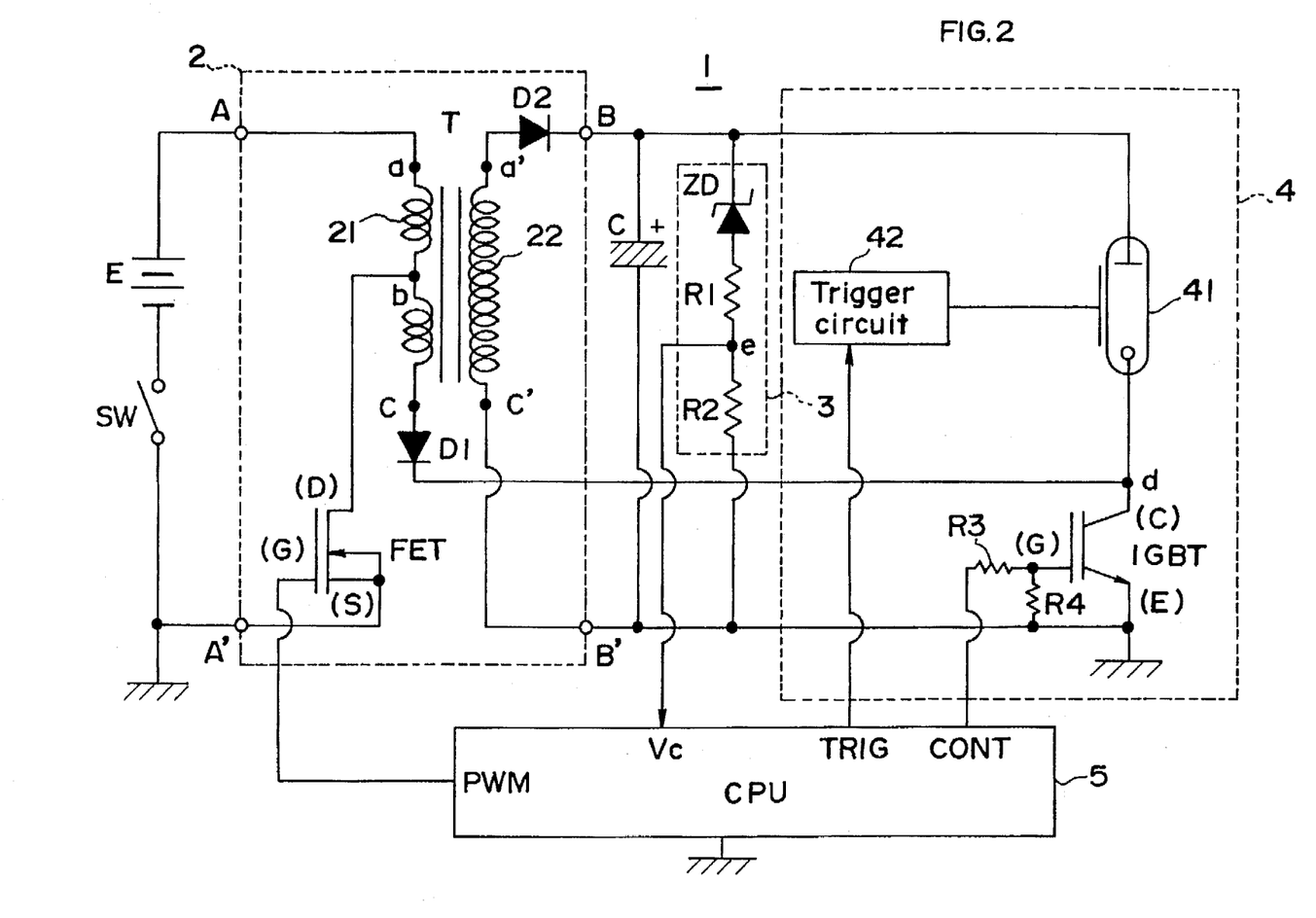
FIG. 2 is also a circuit diagram pertaining to the first embodiment of the present invention.

FIG. 2 is a diagram that shows in more detail the circuit shown in FIG. 1.

In this drawing, a power MOS FET is used for switching element Q1 and an IGBT is used for switching element Q2.

Drain (D) and source (S) of the FET are connected to center tap b of primary coil 21 and input terminal A' of DC-DC converter circuit 2, respectively. Gate (G) of the FET is connected to the PWM terminal of controller 5. Collector (C) and emitter (E) of the IGBT are connected to xenon tube 41 and the negative electrode of main capacitor C, respectively, and gate (G) of the IGBT is connected to the CONT terminal of controller 5 via bias resistors R3 and R4.

Voltage detection circuit 3 comprises a series circuit comprising Zener diode ZD and resistors R1 and R2. Connection point e between resistor R1 and resistor R2 is connected to the VC terminal of controller 5. This voltage detection circuit 3 detects that charge voltage VC has exceeded threshold voltage VTH that is preset based on the voltage of resistor R2 (the voltage at connection point e). Zener voltage VZ of Zener diode ZD is set such that it will be approximately equal to threshold voltage VTH.

Where charge voltage VC of main capacitor C is below Zener voltage VZ of Zener diode ZD, only a small amount of electric current flows due to Zener diode ZD, and therefore voltage Ve at connection point e is approximately 0v. However, where charge voltage VC exceeds Zener voltage VZ, Zener diode ZD enters a 'through' state and voltage Ve at connection point e increases to voltage VC·R2/(R1+R2) that is essentially obtained by dividing charge voltage VC by resistors R1 and R2.

Therefore, from the start of charging of main capacitor C until charge voltage VC reaches threshold voltage VTH, a low detected voltage is input to the VC terminal of controller 5, and when charge voltage VC has exceeded threshold voltage VTH, a high detected voltage is input.

The control by controller 5 of charging and light emission will now be explained with reference to the circuit diagram shown in FIG. 2 and the timing chart shown in FIG. 3.

Figure 3:
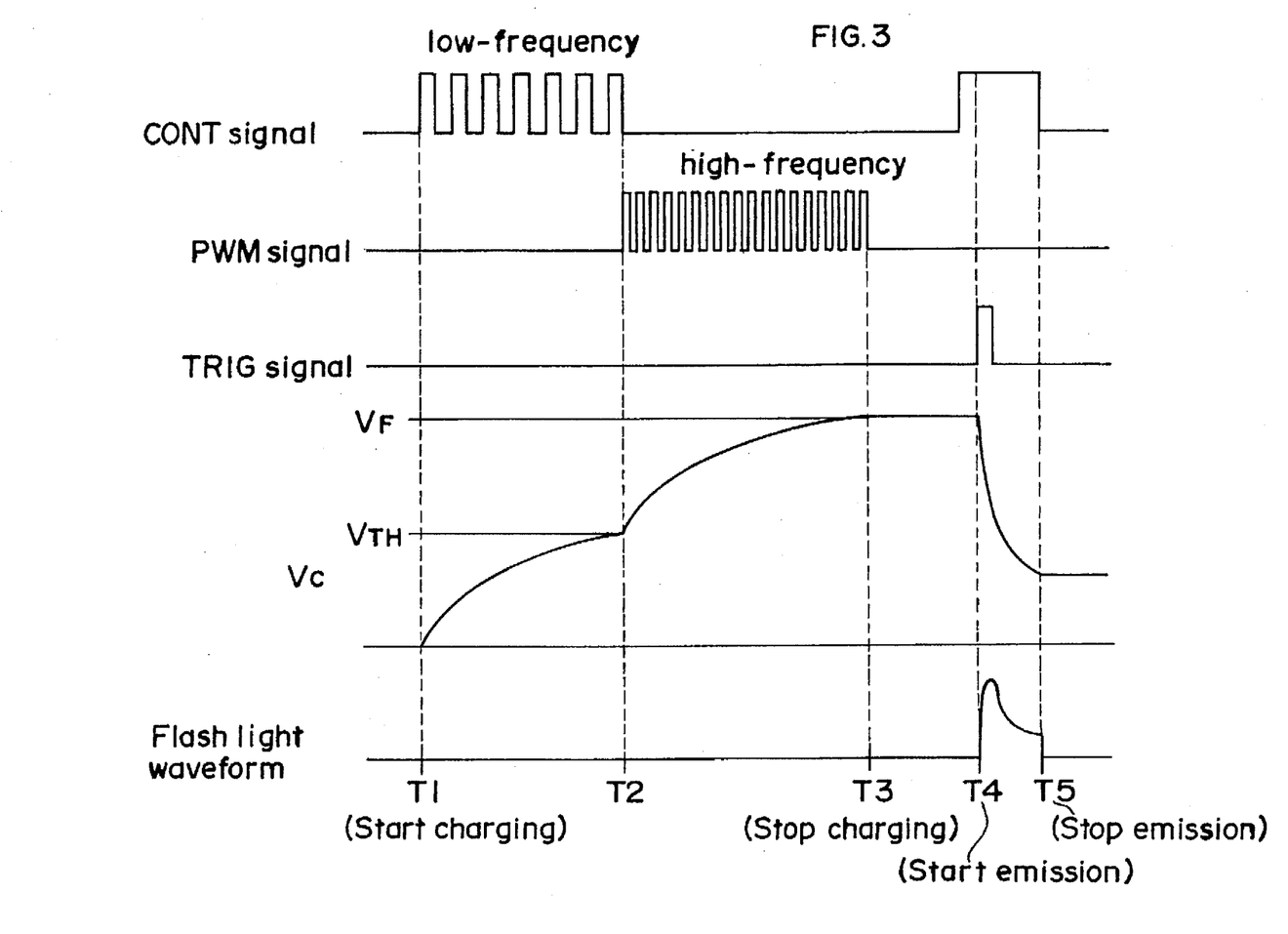
FIG. 3 is a timing chart showing the control of charging and light emission in the first embodiment.
Figure 4:
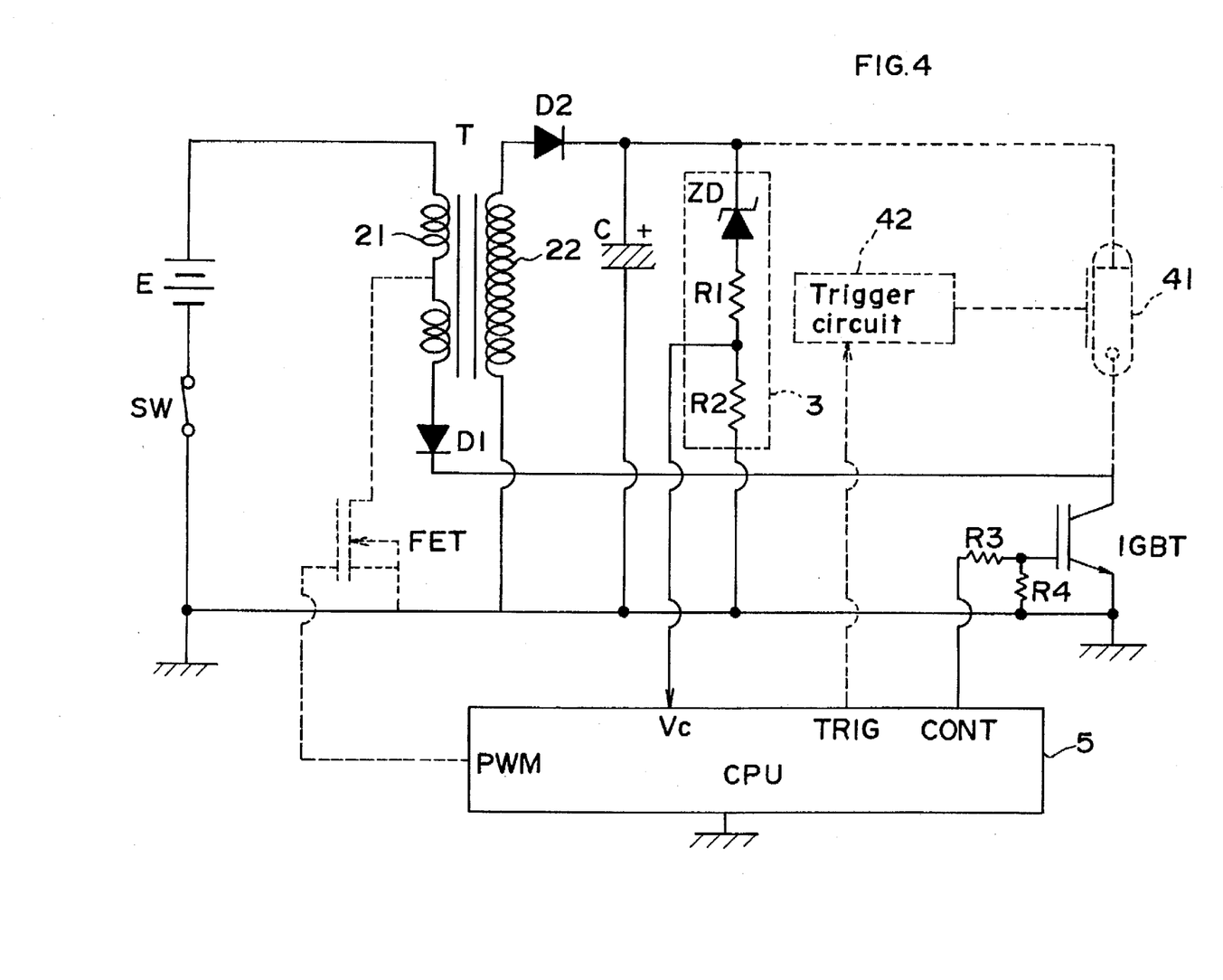
FIG. 4 is a circuit diagram showing the primary circuit of the step-up transformer that operates when the charge voltage is below a threshold level.
Figure 5:
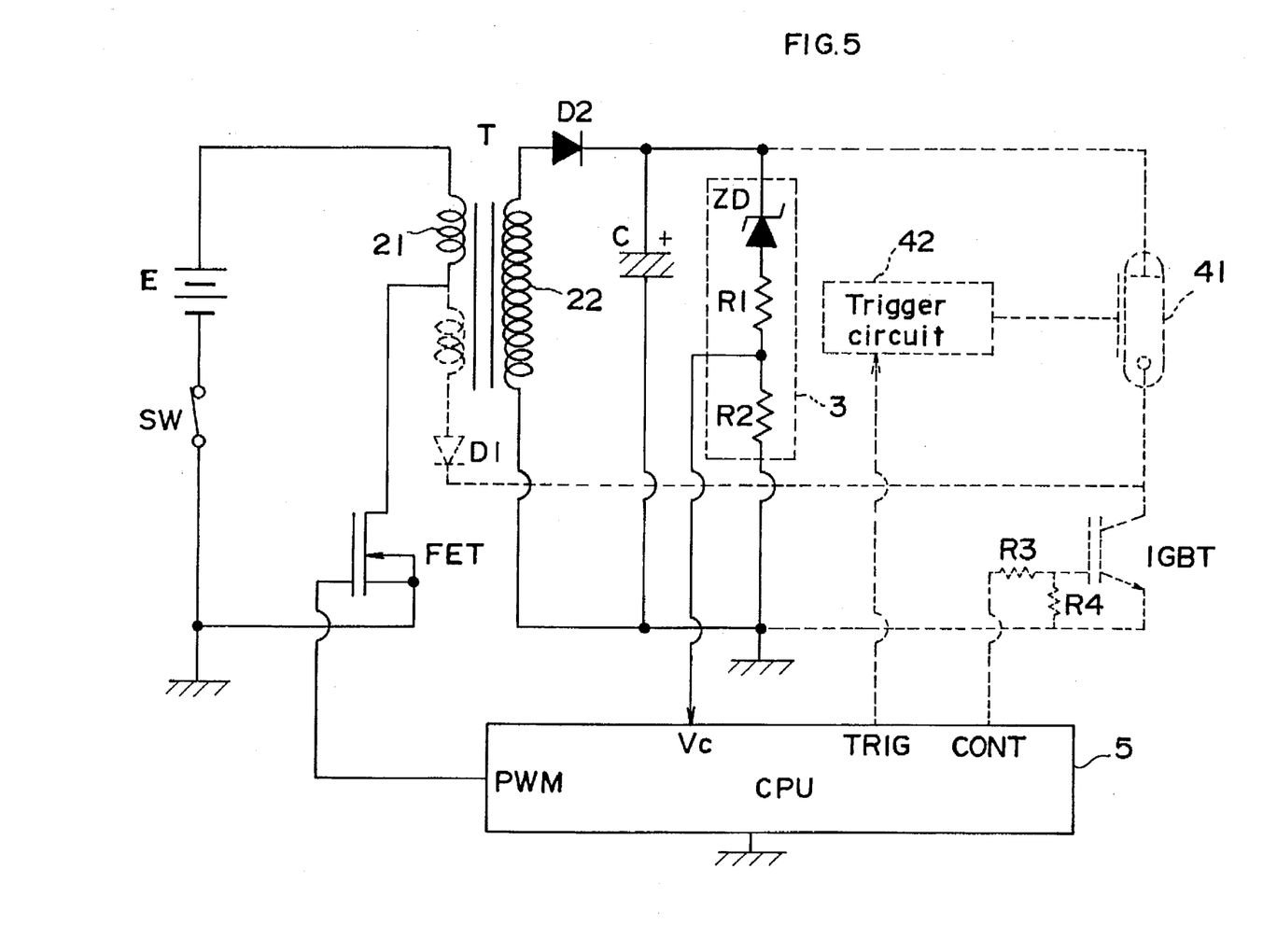
FIG. 5 is a circuit diagram showing the primary circuit of the step-up transformer that operates when the charge voltage has exceeded the threshold level.

When power switch SW is turned ON and a light emission request signal is input from the camera body, for example, controller 5 outputs to the IGBT CONT signals comprising low-frequency pulses and starts charging (at time T1 in FIG. 3). When this happens, the primary circuit of step-up transformer T becomes a series circuit comprising primary coil 21, diode D1 and the IGBT, as shown in FIG. 4. The voltage of step-up transformer T is boosted by means of the voltage from battery E applied to this series circuit that is intermittently interrupted through the turning ON and OFF of the IGBT, and a prescribed high voltage is output from DC-DC converter circuit 2.

Main capacitor C is charged by the output voltage (high voltage) of DC-DC converter circuit 2, and its charge voltage VC increases as charging time t elapses (see T1<t<T2 in FIG. 3). Where this charge voltage VC is below threshold voltage VTH, a low detected voltage is input from voltage detection circuit 3 to controller 5. As long as the detected voltage is low, controller 5 continues to output CONT signals described above.

When charge voltage VC of main capacitor C has reached threshold voltage VTH, a high detected voltage is input from voltage detection circuit 3 to controller 5. In response to this change in the detected voltage, controller 5 stops outputting CONT signals and maintains the IGBT in OFF status. At the same time, it outputs PWM signals comprising high-frequency pulses to the FET and switches the charging of capacitor C to high-speed charging (at time T2 in FIG. 3).

When this happens, the primary circuit of step-up transformer T is changed to a series circuit comprising the secondary coil member of primary coil 21 and the FET. The voltage from battery E that is applied to this series circuit is intermittently interrupted by the turning ON and OFF of the PET, whereby the voltage of step-up transformer T increases.

Twist ratio α decreases due to the changing of the primary circuit of step-up transformer T, and the output voltage of DC-DC converter circuit 2 increases. In other words, if the number of twists of the first coil member (the number of twists between a and c) is N1a, the number of twists of the second coil member (the number of twists between a and b) is N1b (<N1a), and the number of twists of secondary coil 22 is N2, twist ratio α before the change, i.e., N1a/N2, is changed to N1b/N2, and therefore the induced voltage of secondary coil 22 increases by a factor of N1a/N1b (>1).

Further, the switching frequency rises due to the changing of the primary circuit of step-up transformer T, such that the efficiency of DC-DC converter circuit 2 will not be reduced. In other words, if the output voltage of step-up transformer T is V2, appropriate switching frequency f for this output voltage V2 is in general expressed as f=k·V2/N2. Where charge voltage VC, i.e., output voltage V2 of DC-DC converter circuit 2, exceeds threshold voltage VTH, switching frequency f is changed to a prescribed high frequency, and therefore a drop in the transformation efficiency in step-up transformer T is reduced.

After the changing of the primary circuit of step-up transformer T, because charging of capacitor C is carried out at a high voltage without the efficiency being reduced, as described above, capacitor C is charged up to prescribed full charged voltage VF more quickly than before the change (see T2<t<T3 in FIG. 3).

When controller 5 confirms that charge voltage VC of capacitor C has risen to full charged voltage VF based on the detected voltage input by voltage detection circuit 3, it stops the output of PWM signals and discontinues the driving of DC-DC converter circuit 2. At the same time, controller 5 outputs a high-level CONT signal to turn ON the IGBT, whereupon a light emission standby state is entered (see T3<t<T4 in FIG. 3).

When a light emission request signal is then input from the camera body, controller 5 outputs a TRIG signal to trigger circuit 42 instructing it to start light emission, whereupon light emission is begun. When the TRIG signal is input to trigger circuit 42, a trigger voltage is applied to xenon tube 41 in response to said signal, and the charge accumulated in main capacitor C is discharged to the series circuit comprising xenon tube 41 and the IGBT, whereupon flash light is emitted (see time T4 in FIG. 3).

When a light emission stop signal is input from the camera body, controller 5 turns the high-level CONT signal to low-level so that the IGBT is turned OFF. It then forcibly discontinues the discharge of the charge accumulated in main capacitor C and terminates flash light emission (see time T5 in FIG. 3).

As described above, because switching element Q1 placed in the primary circuit of step-up transformer T is used as the high-frequency switching element and switching element Q2 for the control of light emission by xenon tube 41 is used as the low-frequency switching element, and because where charge voltage VC of capacitor C is below threshold voltage VTH, DC-DC converter circuit 2 is driven using a low frequency by means of switching element Q2, while where charge voltage vC of capacitor C exceeds threshold voltage VTH, DC-DC converter circuit 2 is driven using a high frequency by means of switching element Q1, capacitor C can be charged at a high speed and with high efficiency using a simple circuit construction by changing the switching frequency as charge voltage VC increases.

Since switching element Q1 is used when power is low after the charging of capacitor C has progressed, a relatively low-power switching element may be used, which allows the element to be compact.

Since twist ratio α of step-up transformer T is changed together with the changing of the switching frequency so that twist ratio α may be small when charge voltage VC of capacitor C has exceeded threshold voltage VTH, the charging of capacitor C can be sped up and the charging efficiency further improved.

In the embodiment described above, if the IGBT is turned ON during light emission control, the primary circuit of step-up transformer T assumes the circuit construction shown in FIG. 4 and electric current from battery E flows. However, since the time required for light emission control is very short, i.e., several milliseconds, consumption of battery E will not be a problem.

Figure 8:
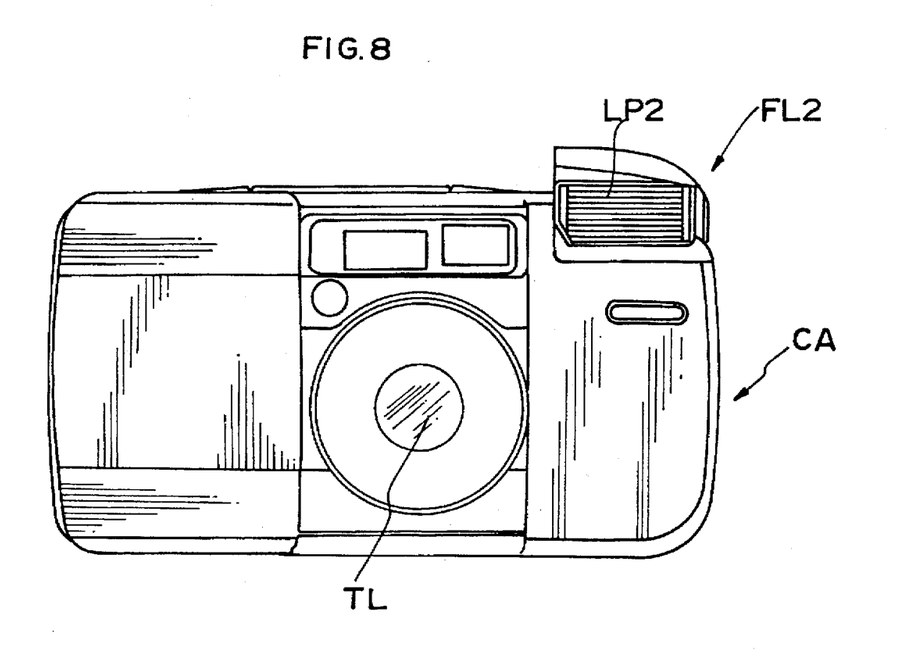
FIG. 8 shows an external view of the camera pertaining to the second embodiment of the present invention.

FIG. 8 shows the external view of the camera pertaining to the second embodiment of the present invention. In the drawing, an electronic flash device FL2 is placed in a corner of camera body CA. The electronic flash device FL2 has flash light emission outlet LP2, which pops up above camera body CA in the drawing in order to increase its distance from photo-taking lens TL.

Figure 6:
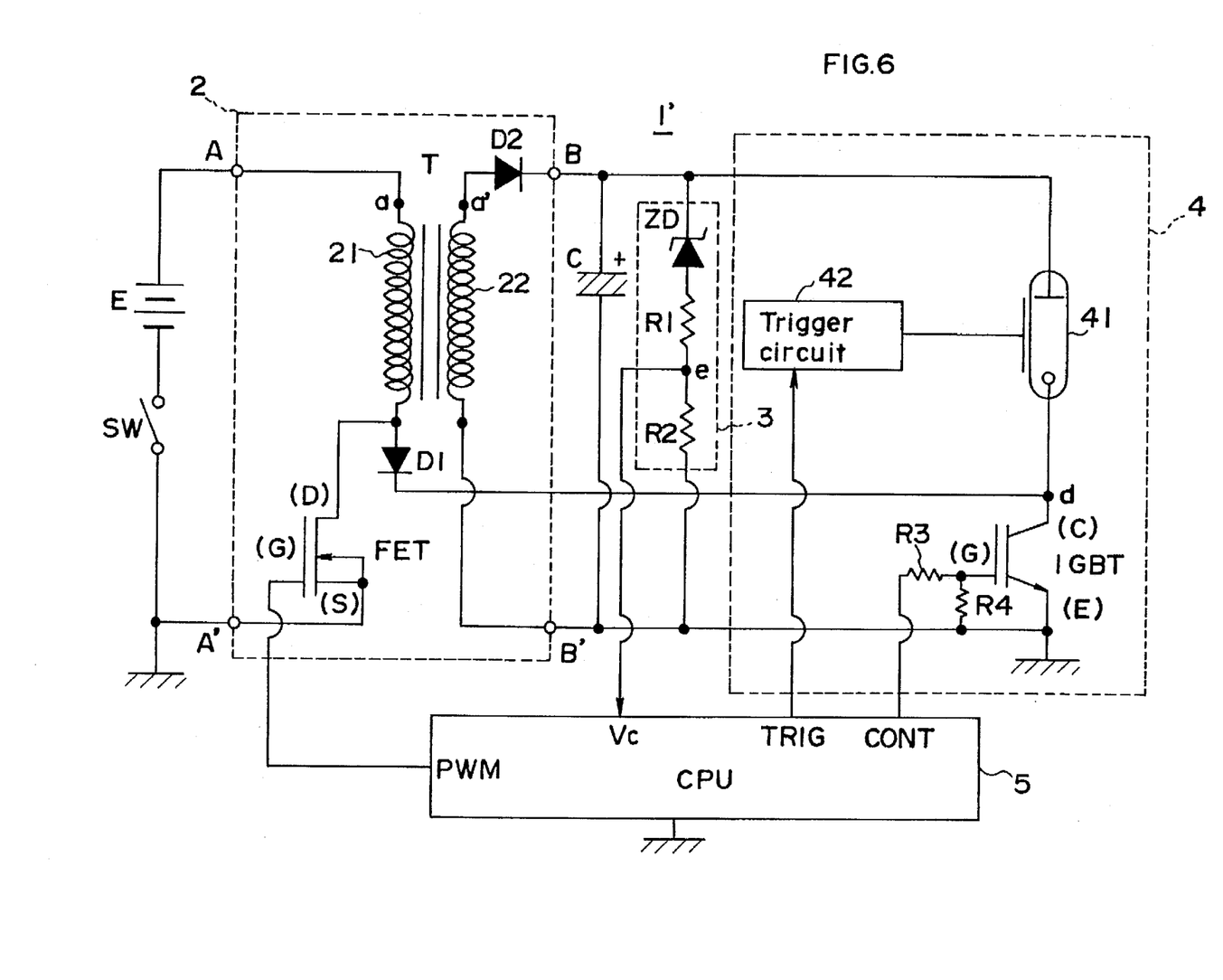
FIG. 6 is a circuit diagram pertaining to a second embodiment of the present invention.

FIG. 6 is a circuit diagram of the electronic flash device FL2 described above.

The circuit shown in this drawing differs from that shown in FIG. 2 in that the connection point of source (S) of the FET is changed from center tap b of primary coil 21 to other end c of primary coil 21, such that twist ratio α will not be changed when charge voltage VC of capacitor C has exceeded threshold voltage VTH.

Because twist ratio α is not changed in the second embodiment, the first embodiment has superior charging efficiency after charge voltage VC of capacitor C has exceeded threshold voltage VTH, but because the switching frequency is changed as charge voltage VC increases, the effect of improved charging efficiency based on this changing of the switching frequency can be obtained in the same manner as in the first embodiment.

As explained above, in the embodiments, using the electronic flash device in which the voltage from a DC power source is boosted by a step-up transformer and charge is accumulated in a charge accumulation element (capacitor) using this boosted voltage, a second switching element that controls the light emission by a flash light generating tube (xenon tube) is also used as a switching element that intermittently interrupts the DC voltage applied to the primary coil of the step-up transformer, and where the voltage of the charge accumulation element is below a prescribed threshold level, the second switching element is turned ON and OFF using a low frequency, while where the voltage of the charge accumulation element has exceeded the prescribed threshold level, a first switching element placed in the primary circuit of the step-up transformer is turned ON and OFF using a high frequency, such that the switching frequency of the step-up transformer is changed as the voltage of the charge accumulation element increases and the switching element is changed depending on whether a low frequency or a high frequency is used. Consequently, charge accumulation of the charge accumulation element at a high speed and with high efficiency becomes possible.

Because the low-frequency switching element is realized using the switching element for light emission discontinuation control pertaining to the flash light generating tube, the effect described above can be obtained without making the circuits complex, and low-cost manufacturing becomes possible. In particular, because the high-frequency switching element is used during low power supply, a relatively low-power element may be used, which contributes accordingly to making the element compact and low cost.

Because the twist ratio of the step-up transformer is made small when the switching frequency is changed to high-frequency, the output voltage of the step-up transformer further increases so that the charge accumulation of the charge accumulation means can be carried out at a higher speed.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An electronic flash comprising:
    a DC power source;
    a transformer including a primary coil, which boosts the output of said DC power source;
    a capacitor which accumulates electric charges boosted by said transformer;
    a discharge tube which emits a flash light by discharging the electric charges accumulated in said capacitor;
    a first switching element which intermittently enables supply of the output from said DC power source to the primary coil;
    a second switching element having a first terminal connected to the primary coil and said discharge tube for intermittently enabling supply of the output from said DC power source to the primary coil and for controlling the light emission of said discharge tube, and a second terminal which is grounded; and
    a selector which selects one of said first and said second switching elements in order to supply the output of said DC power source to the primary coil.

2. An electronic flash as stated in claim 1, wherein switching frequency of said first switching element is higher than that of said second switching element.

3. An electronic flash as stated in claim 1 further comprises a detector which detects the accumulated voltage of said capacitor, wherein said selector selects the second switching element when it is detected that the accumulated voltage is low and selects the first switching element when it is detected that the accumulated voltage is high.

4. An electronic flash as stated in claim 1, wherein number of turns of said primary coil enabled electric supply by said first switching element is smaller than turns of said primary coil enabled second switching electric supply by said element.

5. An electronic flash comprising:
    a transformer including a primary coil, which boosts output of a DC power source;
    a capacitor which accumulates electric charges boosted by said transformer;
    a discharge tube which emits a flash light by discharging the electric charges accumulated in said capacitor;
    a first switching element which intermittently enables supply of the output from said DC power source to the primary coil;

a second switching element having a first terminal connected to the primary coil and said discharge tube for intermittently enabling supply of the output from said DC power source to the primary coil and for controlling the light emission of said discharge tube, and a second terminal which is grounded; and a selector which selects one of said first and said second switching elements in order to supply the output of said DC power source to the primary coil.

6. An electronic flash as stated in claim 5, wherein switching frequency of said first switching element is higher than that of said second switching element.

7. An electronic flash as stated in claim 5 further comprises a detector which detects the accumulated voltage of said capacitor, wherein said selector selects the second switching element when it is detected that the accumulated voltage is low and selects the first switching element when it is detected that the accumulated voltage is high.

8. An electronic flash as stated in claim 5, wherein number of turns of said primary coil enabled electric supply by said first switching element is smaller than turns of said primary coil enabled electric supply by said second switching element.

9. A camera having an electronic flash, said camera comprising:

a DC power source;

a transformer including a primary coil, which boosts the output of said DC power source;

a capacitor which accumulates electric charges boosted by said transformer;

a discharge tube which emits a flash light by discharging the electric charges accumulated in said capacitor;

a first switching element which intermittently enables supply of the output from said DC power source to the primary coil;

a second switching element having a first terminal connected to the primary coil and said discharge tube for intermittently enabling supply of the output from said DC power source to the primary coil and for controlling the light emission of said discharge tube, and a second terminal which is grounded; and a selector which selects one of said first and said second switching elements in order to supply the output of said DC power source to the primary coil.

10. A camera as stated in claim 9, wherein switching frequency of said first switching element is higher than that of said second switching element.

11. A camera as stated in claim 9 further comprises a detector which detects the accumulated voltage of said capacitor, wherein said selector selects the second switching element when it is detected that the accumulated voltage is low and selects the first switching element when it is detected that the accumulated voltage is high.

12. A camera as stated in claim 9, wherein number of turns of said primary coil enabled electric supply by said first switching element is smaller than turns of said primary coil enabled electric supply by said second switching element.

13. A camera having an electronic flash, said camera comprising:

a transformer including a primary coil, which boosts output of a DC power source;

a capacitor which accumulates electric charges boosted by said transformer;

a discharge tube which emits a flash light by discharging the electric charges accumulated in said capacitor;

a first switching element which intermittently enables supply of the output from said DC power source to the primary coil;

a second switching element having a first terminal connected to the primary coil and said discharge tube for intermittently enabling supply of the output from said DC power source to the primary coil and for controlling the light emission of said discharge tube, and a second terminal which is grounded; and a selector which selects one of said first and said second switching elements in order to supply the output of said DC power source to the primary coil.

14. A camera as stated in claim 13, wherein switching frequency of said first switching element is higher than that of said second switching element.

15. A camera as stated in claim 13 further comprises a detector which detects the accumulated voltage of said capacitor, wherein said selector selects the second switching element when it is detected that the accumulated voltage is low and selects the first switching element when it is detected that the accumulated voltage is high.

16. A camera as stated in claim 13, wherein number of turns of said primary coil enabled electric supply by said first switching element is smaller than turns of said primary coil enabled electric supply by said second switching element.

* * * * *